US009808895B2

(12) United States Patent
Huckenbeck et al.

(10) Patent No.: US 9,808,895 B2
(45) Date of Patent: Nov. 7, 2017

(54) METHOD FOR PRODUCING A PISTON PUMP

(71) Applicant: Robert Bosch GmbH, Stuttgart (DE)

(72) Inventors: Bernard Huckenbeck, Weitnau (DE); Marc Zimmermann, Sonthofen (DE); Martin Juretko, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/980,722

(22) Filed: Dec. 28, 2015

(65) Prior Publication Data

US 2016/0129536 A1 May 12, 2016

Related U.S. Application Data

(63) Continuation of application No. 13/823,357, filed as application No. PCT/EP2011/062241 on Jul. 18, 2011.

(30) Foreign Application Priority Data

Sep. 15, 2010 (DE) .................. 10 2010 040 819

(51) Int. Cl.
*B23P 15/10* (2006.01)
*F04B 1/04* (2006.01)
(Continued)

(52) U.S. Cl.
CPC ............ *B23P 15/10* (2013.01); *F04B 1/0452* (2013.01); *F04B 53/1087* (2013.01);
(Continued)

(58) Field of Classification Search
CPC B23P 15/10; F04B 53/14; F04B 53/12; F04B 53/1087

See application file for complete search history.

(56) References Cited

U.S. PATENT DOCUMENTS 3,378,709 A * 4/1968 Lewis .................. H02K 7/083
310/43
7,401,588 B1 * 7/2008 Vanderzyden .......... B23P 15/00
123/193.2
(Continued)

FOREIGN PATENT DOCUMENTS

DE 10 2006 016 290 A1 10/2007
DE 10 2007 047 418 A1 4/2009
(Continued)

OTHER PUBLICATIONS

International Search Report corresponding to PCT Application No. PCT/EP2011/062241, dated Oct. 31, 2011 (German and English language document) (5 pages).

*Primary Examiner* — Ryan J Walters
(74) *Attorney, Agent, or Firm* — Maginot, Moore & Beck LLP

(57) ABSTRACT

A method is used to produce a piston pump having a housing and a piston subassembly. The piston subassembly is displaceably guided in the housing and has a first, rod-like piston element and a second, sleeve-like piston element. The second piston element is connected to the first piston element via a press fit. At least one transverse bore and a longitudinal bore are arranged in the second piston element. A stop edge for the housing is arranged on the second piston element. The piston subassembly also has an inlet valve, which includes a receiving element, in which an inlet valve spring and an inlet valve sealing element are arranged. The piston subassembly also has a corresponding inlet valve seat, which is arranged on the second piston element. While the second piston element is being machined, the press fit and the longitudinal bore are produced and/or finished in one step.

14 Claims, 3 Drawing Sheets

(51) Int. Cl.
    *F04B 53/12*     (2006.01)
    *F04B 53/14*     (2006.01)
    *F04B 53/10*     (2006.01)

(52) U.S. Cl.
    CPC .............. *F04B 53/12* (2013.01); *F04B 53/14* (2013.01); *Y10T 29/49236* (2015.01); *Y10T 29/49252* (2015.01)

(56) References Cited

U.S. PATENT DOCUMENTS

| | | |
|---|---|---|
| 8,845,038 B2 | 9/2014 | Hipp et al. |
| 2009/0185924 A1 | 7/2009 | Bollwerk et al. |
| 2010/0232998 A1 | 9/2010 | Hipp et al. |

FOREIGN PATENT DOCUMENTS

| | | |
|---|---|---|
| DE | 10 2008 015 547 A1 | 10/2009 |
| EP | 0 699 494 A1 | 3/1996 |

\* cited by examiner

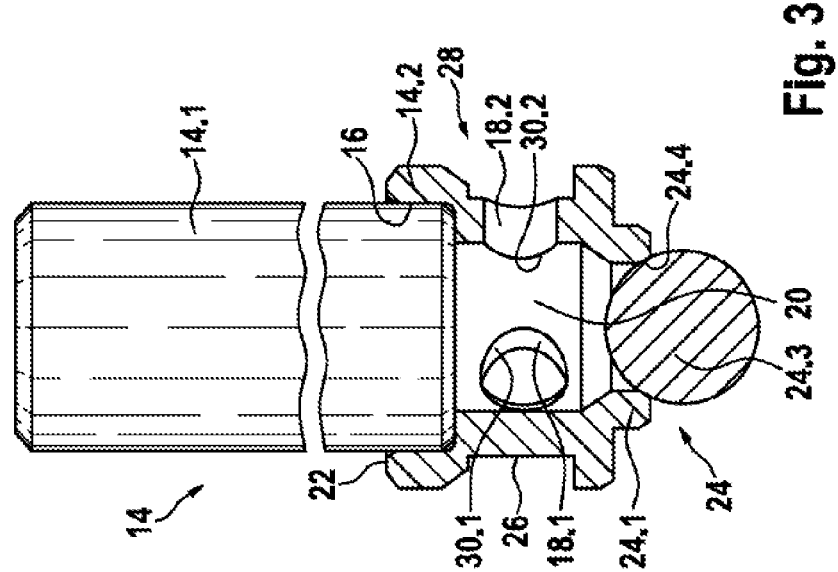
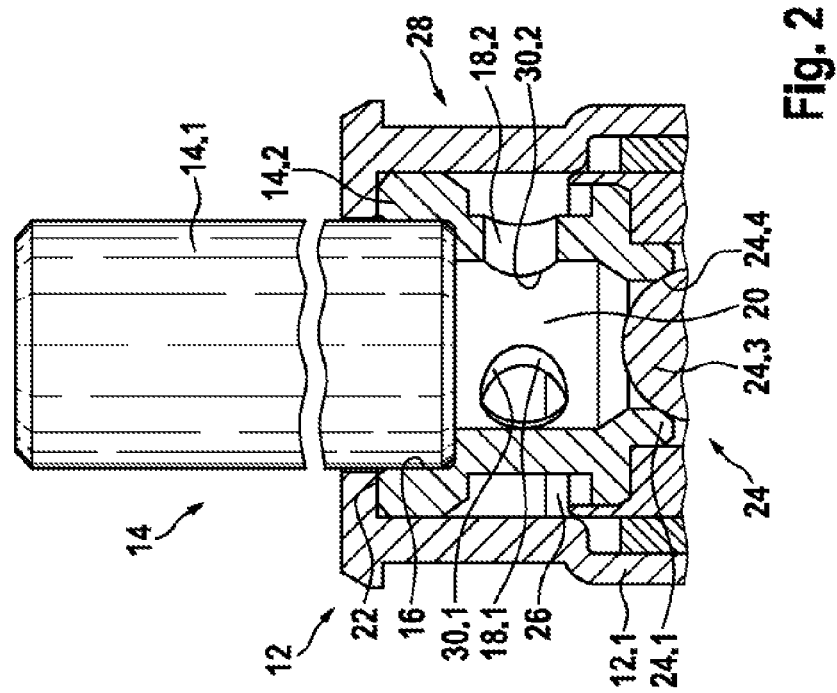

METHOD FOR PRODUCING A PISTON PUMP

This application is a divisional application of copending U.S. application Ser. No. 13/823,357, filed on Jul. 11, 2013, which is a 35 U.S.C. §371 National Stage Application of PCT/EP2011/062241, filed on Jul. 18, 2011, which claims the benefit of priority to Serial No. DE 10 2010 040 819.0, filed on Sep. 15, 2010 in Germany, the disclosures of which are incorporated herein by reference in their entirety

BACKGROUND

The disclosure proceeds from a method for producing a piston pump according to the description below and a piston pump according to the description below which is produced according to a method of this type.

Laid-open specification DE 10 2007 047 418 A1 describes a piston pump having a housing, a piston assembly which is guided displaceably in the housing, and an inlet valve. The piston assembly comprises a first rod-shaped piston element and a second piston element which is connected to the first piston element via a press fit, in which second piston element transverse bores and a longitudinal bore which corresponds with the transverse bores are arranged. The inlet valve comprises a receiving element, in which an inlet valve spring and an inlet valve sealing element are arranged, and a corresponding inlet valve seat which is arranged on the second piston element. The second piston element is configured as a sleeve made from a wear-resistant material which absorbs axially acting force components, the inlet valve seat being arranged on a bending edge of the second piston element which is configured as a sleeve. The second piston element which is configured as a sleeve is produced in a deep drawing process or a cold forming process, the transverse bores being punched or drilled into the piston element.

SUMMARY

In contrast, the method according to the disclosure having the features described below has the advantage that, during machining of the second piston element, the press fit and the longitudinal bore are produced and/or finished in one working step. In an advantageous way, the method according to the disclosure makes simple and inexpensive production of the piston pump possible. In particular, individual machining of the second piston element of the piston assembly of the piston pump is possible, which results, in particular, in an optimized suction region of the piston pump. In particular, the result is advantageously a piston pump which can be configured to be pressure-resistant up to approximately 500 bar. It is particularly advantageous that the stop edge for the housing can be produced and/or finished in addition in said working step.

Advantageous improvements of the method specified in the description below for producing a piston pump and of the piston pump specified in the description below are possible by way of the measures and developments which are described in the description below.

In one advantageous refinement of the method according to the disclosure, in a further working step, an annular channel is produced and/or finished by grooving during a machining operation of an outer circumferential face of the second piston element. For improved media guidance between filter and inlet valve seat, a groove is advantageously made on the outer circumference of the second piston element in a simple production process by turning, as a result of which an annular channel is produced which, in particular, reduces the flow resistance in the piston pump.

In a further advantageous refinement of the method according to the disclosure, in a further working step, the at least one transverse bore is produced and/or finished. The media connection between the annular channel and the longitudinal bore is advantageously produced in a simple production process, by a plurality of transverse bores connecting the annular channel to the longitudinal bore. A particularly favorable effect is produced by the groove of the annular channel, the transverse bore and the large longitudinal bore which lead to a small wall thickness and accordingly to a reduced flow resistance in the piston and in the piston pump.

Furthermore, it is proposed that, in a further working step, at least one inner face region of the second piston element is deburred. The burr at the intersection of the longitudinal bore to the transverse bore can be removed in a defined manner particularly simply and favorably by means of a special milling tool, which results in a reduced flow resistance.

Furthermore, it is proposed that the second piston element of sleeve-shaped configuration is produced in a material-removing production process, which results in simple and inexpensive production of the component.

One preferred realization of the method according to the disclosure provides that the second piston element of sleeve-shaped configuration is produced as a turned part, which results in simple production of the component, which production is suitable, in particular, for series manufacturing.

The machining of the piston element preferably takes place at least partially by way of a stepped tool. The production of the second piston element advantageously takes place by way of a stepped tool in one process or working step, it being possible for the press fit, the transverse bores, the longitudinal bore and/or the stop edge to be produced at the same time. As a result, a multifunctional piston element can be produced particularly precisely and inexpensively in great quantities in short machining cycles.

A piston pump according to the disclosure comprises a housing, a piston assembly which is guided displaceably in the housing with a first rod-shaped piston element and a second sleeve-shaped piston element which is connected to the first piston element via a press fit, in which second sleeve-shaped piston element at least one transverse bore and a longitudinal bore which corresponds with the at least one transverse bore are arranged, and an inlet valve which comprises a receiving element, in which an inlet valve spring and an inlet valve sealing element are arranged, and a corresponding inlet valve seat which is arranged on the second piston element, the second piston element being produced by the above-described method according to the disclosure. This advantageously results, with inexpensive production of the components, in a piston pump having an inlet valve seat which is optimized in terms of flow and production. On account of the embodiment according to the disclosure of the second piston element, machining of the piston element on a rotary indexing table is possible. The housing of the piston pump is preferably configured at least partially as a filter element.

Advantageous embodiments of the disclosure are shown in the drawings and will be described in the following text. In the drawings, identical designations denote components or elements which perform identical or analogous functions.

BRIEF DESCRIPTION OF THE DRAWINGS

FIG. 2 shows a cross section through a first housing section of the piston pump, in which a piston assembly having a first and a second piston element are guided, and a part of an inlet valve of the piston pump.

FIG. 3 shows a cross section through the second piston element having an inlet valve seat, against which an inlet valve sealing element of the inlet valve bears.

DETAILED DESCRIPTION

Figure 1:
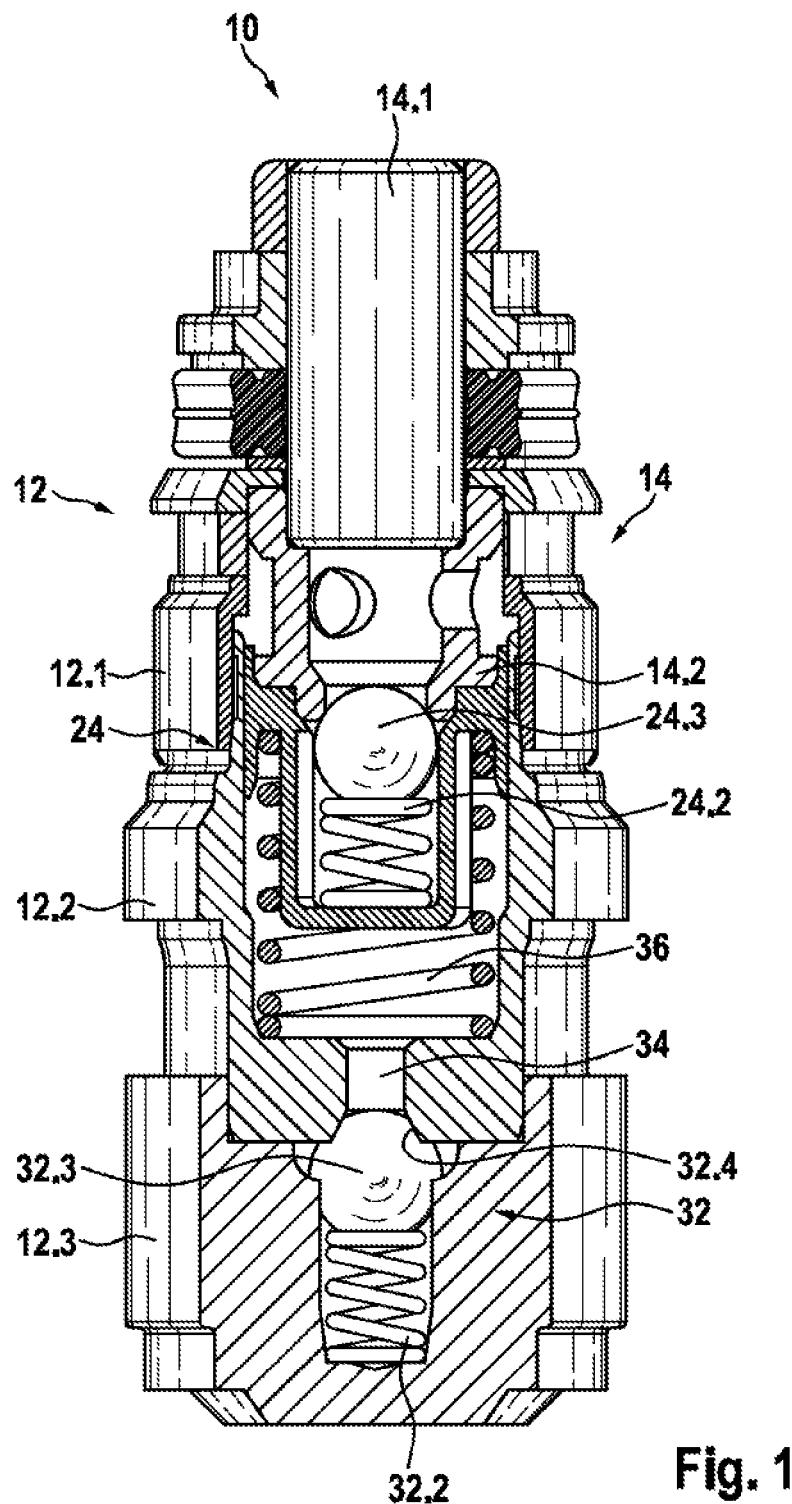
FIG. 1 shows a diagrammatic perspective illustration of a piston pump according to the disclosure.

As can be seen from FIG. 1, a piston pump 10 according to the disclosure comprises a piston assembly 14, an inlet valve 24, an outlet valve 32 and a housing 12. Since the construction and function of piston pumps of this type are known per se, the drawing and description are restricted to that part of the piston pump 10 which is relevant to the disclosure, in order to clearly illustrate the disclosure.

The pump which is described can be used, for example, as a delivery or recirculating pump of a hydraulic pump system of a vehicle. The pump 10 is used, for example, in pump systems of modern automotive technology which relate by way of example to the safety technologies such as ABS (antilock brake system), ESP (electronic stability program), EHB (electrohydraulic brake), TCS (traction control system) or ASR (antislip control system).

The housing 12 comprises a plurality of housing sections 12.1, 12.2 and 12.3 which receive the piston assembly 14, the inlet valve 24 and the outlet valve 32. The piston assembly 14 which is guided displaceably in a housing section 12.1 of the housing 12 comprises a first rod-shaped piston element 14.1 and a second piston element 14.2 which is connected fixedly to the first piston element 14.1 via a press fit 16 and in which at least one transverse bore 18.1, 18.2 and a longitudinal bore 20 which corresponds with the at least one transverse bore 18.1, 18.2 are arranged. Here, the second piston element 14.2 is of sleeve-shaped configuration. In the present exemplary embodiment, a plurality of transverse bores 18.1, 18.2 which correspond with the longitudinal bore 20 are provided in the second piston element 14.2.

The inlet valve 24 of the piston pump 10 according to the disclosure is configured as a nonreturn valve and comprises a receiving element 24.1, in which an inlet valve spring 24.2 and an inlet valve sealing element 24.3 are arranged, and a corresponding inlet valve seat 24.4. The inlet valve seat 24.4 is arranged on the second sleeve-shaped piston element 14.2 and preferably here on an edge of the second piston element 14.2 of sleeve-shaped configuration. The inlet valve sealing element 24.3 is preferably configured as a sealing sphere. The inlet valve sealing element 24.3 is pressed sealingly into the corresponding inlet valve seat 24.4 by a spring force of the inlet valve spring 24.2.

In an advantageous way, the second piston element 14.2 fulfills a plurality of functions. The piston element 14.2 has the function of an inlet channel 20, configured as a longitudinal bore, for the fluid of the piston pump 10, of an inlet valve seat 24.4 for the inlet valve sealing element 24.3 of the inlet valve 24, of a receptacle for a high pressure seal which is not described in greater detail, of a press fit 16 for the first piston element 14.1, of an annular channel 26 for guiding the fluid of the piston pump 10, and of a stop for the housing element 12.1 or the filter.

The outlet valve 32 is likewise configured as a spring-loaded nonreturn valve and is arranged in a housing section 12.3 of the housing 12. The outlet valve 32 is opened if a pressure in a compression space 34 is greater than a spring force of an outlet valve spring 32.2, which spring force acts on an outlet valve sealing element 32.3 of the outlet valve 32, as a result of which the outlet valve sealing element 32.3 is pressed out of an outlet valve seat 32.4 which is arranged on an outlet opening of the housing section 12.2.

As can be further seen from FIG. 1, the piston assembly is guided with the inlet valve 24 longitudinally movably in the housing 12, fluid being sucked in radially during a suction stroke of the piston assembly via the housing 12 which is configured at least partially as a filter element or via the housing section 12.1 which is configured at least partially as a filter element, through an annular channel 26 and the transverse bores 18.1, 18.2 in the second piston element 14.2, and being guided via the longitudinal bore 20 which corresponds with the transverse bores 18.1, 18.2 through the open inlet valve 24 into the compression space 34.

After a top dead center has been reached, the movement direction of the piston assembly 14 reverses, with the result that the second piston element 14.2 is pressed sealingly with the inlet valve seat 24.4 onto the inlet valve sealing element 24.3 via the first piston element 14.1 which is driven by an eccentric (not shown here), and the inlet valve 24 is closed. A pressure build-up then takes place in the compression space 34 until the pressure in the compression space 34 is greater than the spring force of the outlet valve 32, as a result of which the pressurized fluid is guided via the open outlet valve 32 out of the compression space 34 into an outlet line (not shown).

After a bottom dead center has been reached, the movement direction of the piston assembly 14 reverses again, with the result that the outlet valve 32 closes again and the intake stroke begins again, a restoring force of a restoring spring 36 which is arranged in the compression space 34, is configured, for example, as a helical spring and is supported on a bottom of the housing section 12.2. The restoring force acts on the second piston element 14.2, as a result of which the piston assembly 14 is moved again in the direction of the top dead center.

Figure 4:
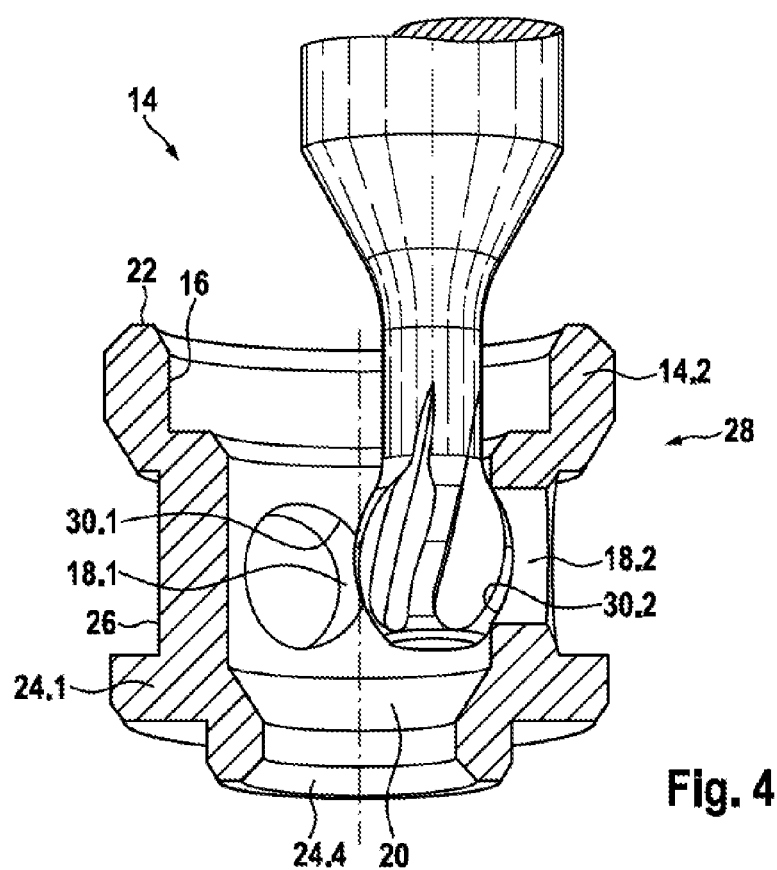
FIG. 4 shows a diagrammatic perspective illustration of the second piston element with a tool for deburring an inner face region of the piston element.

As can be seen from FIGS. 2 to 4, the piston pump 10 is produced in accordance with a method according to the disclosure. As has already been mentioned, the piston pump 10 comprises the housing 12, the piston assembly 14 which is guided displaceably in the housing 12 with the first piston element 14.1 and the second piston element 14.2 which is connected in a positively locking manner to the first piston element 14.1 via the press fit 16 and in which the transverse bores 18.1, 18.2 and the longitudinal bore 20 which corresponds with the transverse bores 18.1, 18.2 are arranged, and the inlet valve 24 which comprises the receiving element 24.1, in which the inlet valve spring 24.2 and the inlet valve sealing element 24.3 are arranged, and the corresponding inlet valve seat 24.4 which is arranged on the second piston element 14.2. Here, the housing section 12.1 and the second sleeve-shaped piston element 14.2 are configured in such a way that an annular channel 26 is formed between the two components 12.1, 14.2.

During the production of the piston pump 10, according to the disclosure, the press fit 16 and the longitudinal bore 20 are produced and/or finished in one working step during a machining operation of the second piston element 14.2. In the same working step, the stop edge 22 for the housing 12 or the housing section 12.1 of the housing 12 can additionally be produced and/or finished at the same time.

In a further working step, the annular channel 26 is produced and/or finished by grooving during a machining operation of an outer circumferential face 28 of the second piston element 14.2. Here, the remaining outer circumferential face 28 can remain in the raw state, that is to say without further or precision machining, since said face 28 performs no further function apart from a holding function in the housing section 12.1. In a further working step, the at least one transverse bore or the transverse bores 18.1, 18.2 is/are produced and/or finished. As can be seen in FIG. 4, in a further working step, at least one inner face region 30.1, 30.2 of the second piston element 14.2 is deburred. In the present exemplary embodiment, a burr is preferably removed at the transverse bores 18.1, 18.2.

In an advantageous way, the second piston element 14.2 of sleeve-shaped configuration can be produced in a material-removing production process. Here, the second piston element 14.2 of sleeve-shaped configuration can be produced as a turned part. The machining of the piston element 14.2 preferably takes place at least partially by way of a stepped tool.

The invention claimed is:

1. A method for producing a piston pump having a housing, comprising:
   producing a piston assembly configured to be guided displaceably in the housing, producing the piston assembly including:
      producing a first rod-shaped piston element,
      producing a second sleeve-shaped piston element, and
      connecting the second sleeve-shaped piston element to the first rod-shaped piston element via a press fit with a stop edge for the housing on the second sleeve-shaped piston element positioned directly radially outwardly of the first rod-shaped piston element, wherein producing the second sleeve-shaped piston element includes arranging at least one transverse bore and a longitudinal bore which corresponds with the at least one transverse bore in the second sleeve-shaped piston element, and arranging the stop edge for the housing on the second sleeve-shaped piston element;
   producing an inlet valve including a receiving element in which an inlet valve spring and an inlet valve sealing element are arranged, and
   arranging an inlet valve seat corresponding to the inlet valve on the second sleeve-shaped piston element,
   wherein, during machining of the second sleeve-shaped piston element, the press fit and the longitudinal bore are at least one of produced and finished.

2. The method as claimed in claim 1, wherein arranging the stop edge for the housing includes at least one of producing and finishing the stop edge.

3. The method as claimed in claim 1, further comprising at least one of producing and finishing an annular channel by grooving during a machining operation of an outer circumferential face of the second sleeve-shaped piston element.

4. The method as claimed in claim 1, further comprising at least one of producing and finishing the at least one transverse bore.

5. The method as claimed in claim 1, further comprising deburring at least one inner face region of the second sleeve-shaped piston element.

6. The method as claimed in claim 1, wherein producing the second sleeve-shaped piston element includes using a material-removing production process.

7. The method as claimed in claim 1, wherein producing the second sleeve-shaped piston element includes producing the second sleeve-shaped piston element as a turned part.

8. The method as claimed in claim 1, wherein producing the second sleeve-shaped piston element includes:
   producing the second sleeve-shaped piston element at least partially with a stepped tool.

9. The method as claimed in claim 8, wherein producing the second sleeve-shaped piston element includes at least partially producing the press fit with the stepped tool contemporaneously with producing the second sleeve-shaped piston element at least partially with the stepped tool.

10. The method as claimed in claim 8, wherein producing the second sleeve-shaped piston element includes at least partially producing the at least one transverse bore with the stepped tool contemporaneously with producing the second sleeve-shaped piston element at least partially with the stepped tool.

11. The method as claimed in claim 8, wherein producing the second sleeve-shaped piston element includes at least partially producing the stop edge with the stepped tool contemporaneously with producing the second sleeve-shaped piston element at least partially with the stepped tool.

12. The method as claimed in claim 8, wherein producing the second sleeve-shaped piston element includes:
   at least partially producing the press fit with the stepped tool contemporaneously with producing the second sleeve-shaped piston element at least partially with the stepped tool;
   at least partially producing the at least one transverse bore with the stepped tool contemporaneously with producing the second sleeve-shaped piston element at least partially with the stepped tool; and
   at least partially producing the stop edge with the stepped tool contemporaneously with producing the second sleeve-shaped piston element at least partially with the stepped tool.

13. A method for producing a piston pump having a housing, comprising:
   producing a piston assembly configured to be guided displaceably in the housing, producing the piston assembly including:
      producing a first rod-shaped piston element,
      at least partially producing a stop edge with a stepped tool contemporaneously with producing a second sleeve-shaped piston element at least partially with the stepped tool, and
      connecting the second sleeve-shaped piston element to the first rod-shaped piston element via a press fit, wherein producing the second sleeve-shaped piston element includes arranging at least one transverse bore and a longitudinal bore which corresponds with the at least one transverse bore in the second sleeve-shaped piston element, and arranging a stop edge for the housing on the second sleeve-shaped piston element;
   producing an inlet valve including a receiving element in which an inlet valve spring and an inlet valve sealing element are arranged, and
   arranging an inlet valve seat corresponding to the inlet valve on the second sleeve-shaped piston element,
   wherein, during machining of the second sleeve-shaped piston element, the press fit and the longitudinal bore are at least one of produced and finished.

14. A method for producing a piston pump having a housing, comprising:
   producing a piston assembly configured to be guided displaceably in the housing, producing the piston assembly including:
      producing a first rod-shaped piston element, producing a second sleeve-shaped piston element, and
connecting the second sleeve-shaped piston element to the first rod-shaped piston element via a press fit, wherein producing the second sleeve-shaped piston element includes arranging at least one transverse bore and a longitudinal bore which corresponds with the at least one transverse bore in the second sleeve-shaped piston element, and arranging a stop edge for the housing on the second sleeve-shaped piston element;
producing an inlet valve including a receiving element in which an inlet valve spring and an inlet valve sealing element are arranged, and
arranging an inlet valve seat corresponding to the inlet valve on the second sleeve-shaped piston element, wherein, during machining of the second sleeve-shaped piston element, the press fit and the longitudinal bore are formed during a single working step.

\* \* \* \* \*